US012725326B2

(12) United States Patent
Kim et al.

(10) Patent No.: US 12,725,326 B2
(45) Date of Patent: Sep. 1, 2026

(54) ENCODING METHOD OF CONVERTING TIME SERIES DATA INTO IMAGE

(71) Applicant: UNIST(ULSAN NATIONAL INSTITUTE OF SCIENCE AND TECHNOLOGY), Ulsan (KR)

(72) Inventors: Sung Il Kim, Ulsan (KR); Yong Kyung Oh, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 198 days.

(21) Appl. No.: 18/395,620

(22) Filed: Dec. 24, 2023

(65) Prior Publication Data

US 2024/0212237 A1 Jun. 27, 2024

(30) Foreign Application Priority Data

Dec. 23, 2022 (KR) ........................ 10-2022-0183341

(51) Int. Cl.
*G06T 11/26* (2026.01)
*G06T 11/60* (2006.01)

(52) U.S. Cl.
CPC .............. *G06T 11/26* (2026.01); *G06T 11/60* (2013.01)

(58) Field of Classification Search
CPC ............................... G06T 11/206; G06T 11/60
See application file for complete search history.

(56) References Cited

U.S. PATENT DOCUMENTS

2018/0260697 A1* 9/2018 Sun ........................ G06N 5/022

FOREIGN PATENT DOCUMENTS

| | | | |
|---|---|---|---|
| CN | 108182260 | A | 6/2018 |
| CN | 114997285 | A | 9/2022 |
| KR | 10-2113218 | B1 | 5/2020 |
| KR | 10-2163155 | B1 | 10/2020 |
| KR | 10-2261941 | B1 | 6/2021 |
| KR | 10-2022-0059691 | A | 5/2022 |

OTHER PUBLICATIONS

Wang et al, "Encoding Time Series as Images for Visual Inspection and Classification Using Tiled Convolutional Neural Networks", https://www.researchgate.net/publication/275970614_Encoding_Time_Series_as_Images_for_Visual_Inspection_and_Classification_Using_Tiled_Convolutional_Neural_Networks, 2015. (Year: 2015).*
Yongkyung Oh et al, "Multivariate time series classification using multi channel CNN classifier", Korean Institute of Industrial Engineers, 2022 KIIE/KORMS Spring Joint Conference, Jun. 6, 2022, pp. 1-8.

* cited by examiner

*Primary Examiner* — Michelle L Sams
(74) *Attorney, Agent, or Firm* — Revolution IP, PLLC

(57) ABSTRACT

The present disclosure provides an encoding method of converting time series data to an image which includes encoding each univariate time series data into a binary image, combining the binary image with a multi-channel image, performing convolution on the multi-channel image, and performing task using data obtained by the convolution.

3 Claims, 3 Drawing Sheets

Value
Time
(a) Raw time series
(ArticularyWordRecognition)
(b) RP
(c) MFT
(d) GASF
(e) GADF
(f) SP
(g) SC
(h) GS
(i) TSSI (a) MTF
(b) TSSI

ENCODING METHOD OF CONVERTING TIME SERIES DATA INTO IMAGE

CROSS-REFERENCE TO RELATED APPLICATION

This application is based on and claims priority under 35 U.S.C. § 119 to Korean Patent Application No. 10-2022-0183341, filed on Dec. 23, 2022, in the Korean Intellectual Property Office, the disclosure of which is incorporated by reference herein in its entirety.

BACKGROUND

1. Field

The present disclosure relates to an encoding method of converting time series data into an image, and more particularly, to a new two-dimensional (2D) convolutional neural network (CNN)-based method for solving multivariate time series classification (MTSC) problems, that is, an encoding method of converting time series data to an image in which each univariate time series data encoded into a binary image and resulting multiple binary images are concatenated to a single multi-channel image by using the multiple binary images as an input to a 2D sparse convolutional layer.

2. Description of the Related Art

Recently, deep neural network models have been succeeded in a wide range of fields, and accordingly, neural network-based methods are proposed in an MTSC field. In particular, the CNN methods are being applied in various fields and show excellent performance in MTSC.

The CNN methods for solving the known MTSC are based on one-dimensional CNN methodology. That is, the CNN methods consider temporal correlation by applying convolution to a time dimension of time series data. Although this approach may be considered suitable for analyzing temporal correlations and extracting latent characteristics in univariate time series data, the approach has limitations in capturing complex relationships between variables in multivariate time series data.

Another neural network model approaching method is to convert time series data into images and then apply a two-dimensional CNN methodology. A 2D CNN may consider the time dimension and correlations between variables in multivariate time series more flexibly than one dimensional (1D) CNN, but the 2D CNN has limitation that feature extraction performance and classification performance are largely dependent on an image transformation methodology. Widely used methods include recurrence plots (RP), Markov transition fields (MTF), and Gramian angular fields (GAF). However, the known image conversion methods focus on analyzing relationships between data of time series data. Accordingly, it can be seen that there are limitations in situations where correlations between variables change dynamically over time.

According to the present disclosure, when encoding univariate time series data into a multi-channel binary image, the characteristics of a time axis and the values at that point may be expressed in two dimensions, and thereby, the characteristics are effectively extracted and efficient work may be performed by reducing the amount of calculation.

SUMMARY

The present disclosure provides a new two-dimensional (2D) convolutional neural network (CNN)-based method for solving multivariate time series classification (MTSC) problems, that is, an encoding method of converting time series data to an image in which each univariate time series data encoded into a binary image and resulting multiple binary images are concatenated to a single multi-channel image by using the multiple binary images as an input to a 2D sparse convolutional layer.

According to an aspect of the present disclosure, an encoding method of converting time series data to an image may include encoding each univariate time series data into a binary image, combining the binary image with a multi-channel image, performing convolution on the multi-channel image, and performing task using data obtained by the convolution.

According to the present disclosure, when encoding univariate time series data into a multi-channel binary image, the characteristics of a time axis and the values at that point may be expressed in two dimensions, and thereby, the characteristics are effectively extracted and efficient work may be performed by reducing the amount of calculation.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
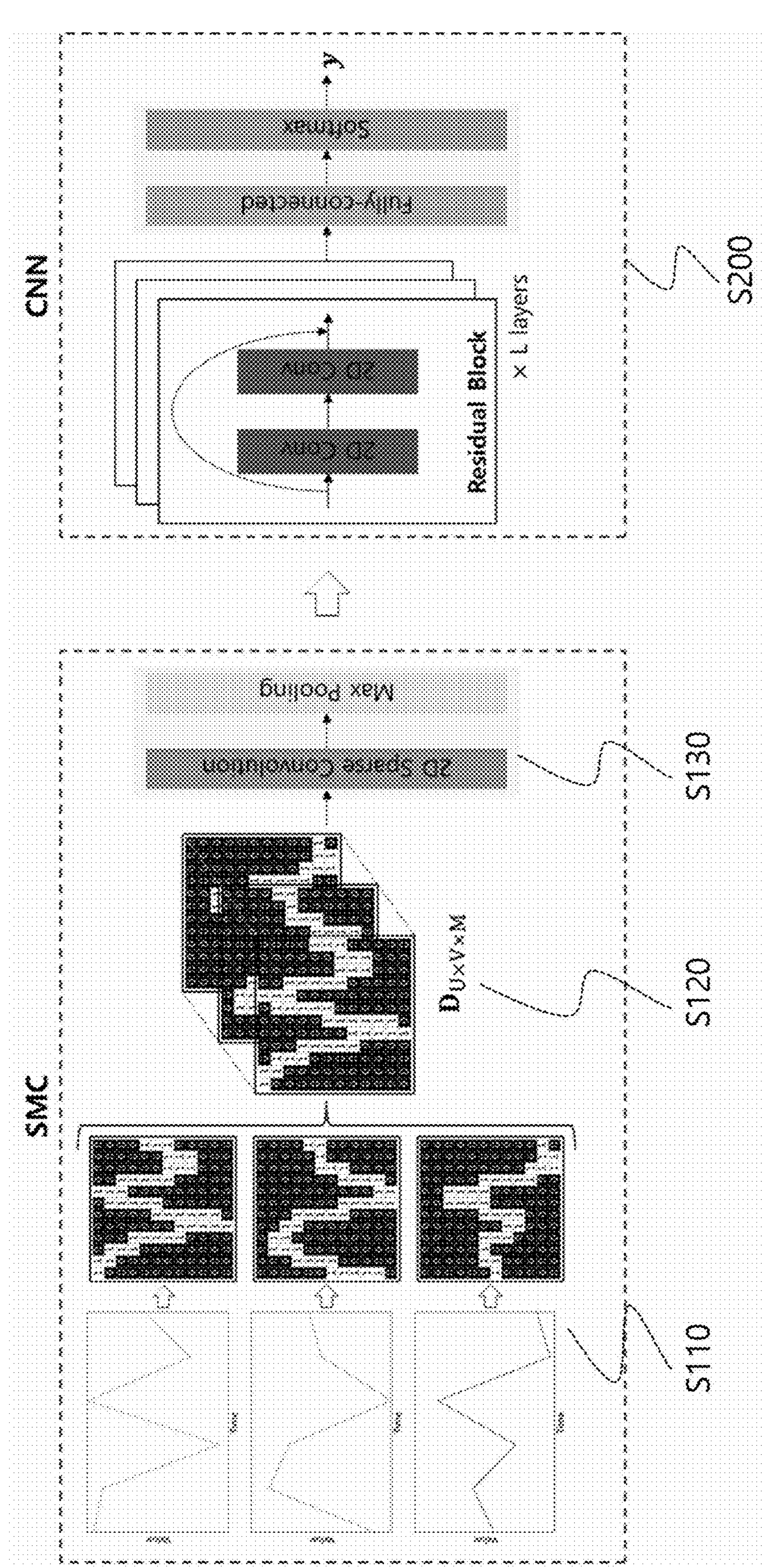
FIG. 1 is a diagram illustrating an overall procedure of an encoding method of converting time series data into an image, according to an embodiment of the present disclosure.

Hereinafter, preferred embodiments according to the present disclosure are described in detail with reference to the attached drawings. In this process, thicknesses of lines or sizes of components illustrated in the drawings may be exaggerated for the sake of clarity and convenience of description.

In addition, the terms to be described below are terms defined in consideration of functions in the present disclosure and may vary depending on intentions or customs of users or operators. Therefore, definitions of the terms should be made based on the content throughout the present specification.

FIG. 1 is a diagram illustrating an overall procedure of an encoding method of converting time series data into an image, according to an embodiment of the present disclosure.

Referring to FIG. 1, the encoding method of converting time series data into an image includes step S110 of encoding each univariate time series data into a binary image, step S120 of combining the binary image with a multi-channel image, step S130 of performing convolution by the using the multi-channel image, and step S140 of performing tasks by using a convolution data as an input.

In step S110 of encoding each univariate time series data into a binary image, multiple pieces of univariate time series data are encoded into binary images by using a time axis and a time series value axis respectively as the x-axis and y-axis.

Specifically, $x_m=(x_{m,1}, \ldots, x_{m,T_m})$ is set as m-th univariate time series data. Considering a configuration of $x_m$, a range of the x-axis is from 0 to $T_m$, and a range of the y-axis is from the minimum value of all time series values to the maximum value of all time series values (that is, $X_i$, i=1 . . . N).

Thereafter, the time series data is encoded as a binary image $D_m=(d_{u,v})\in \mathbb{R}^{U\times V}$ in a U×V pixel grid. Here, U and V are user values that determine a pixel size, and a pixel value of the binary image is determined by Equation 1 below.

$$d_{u,v} = \begin{cases} 1 \\ 0 \end{cases} \quad \text{Equation 1}$$

In this case, 1 is a value when a pixel includes one or more time series data, and 0 is a value when the pixel does not include one or more time series data.

In this case, when $T_m$<<U, the time series data may be supplemented to ensure continuity.

In step S120 of combining the binary image with a multi-channel image, multiple binary images encoded in step S110 of encoding each univariate time series data into a binary image may be concatenated to one multi-channel image.

In step S130 of performing convolution, the multi-channel image generated in step S120 of combining the binary image with the multi-channel image is classified into a region where data exists and a background image, and then convolution is applied only to region where data exists.

A filter used in this case is 2D sparse convolution filter of CNN and spatially preserves the existing time-value dependency in an obtainable time series image.

In step S140 of performing tasks, tasks (such as classification, clustering and anomaly detection) are performed by using convolution data as an input.

In this case, the classification through the CNN-based classifier may be performed by the known method.

Figure 2:
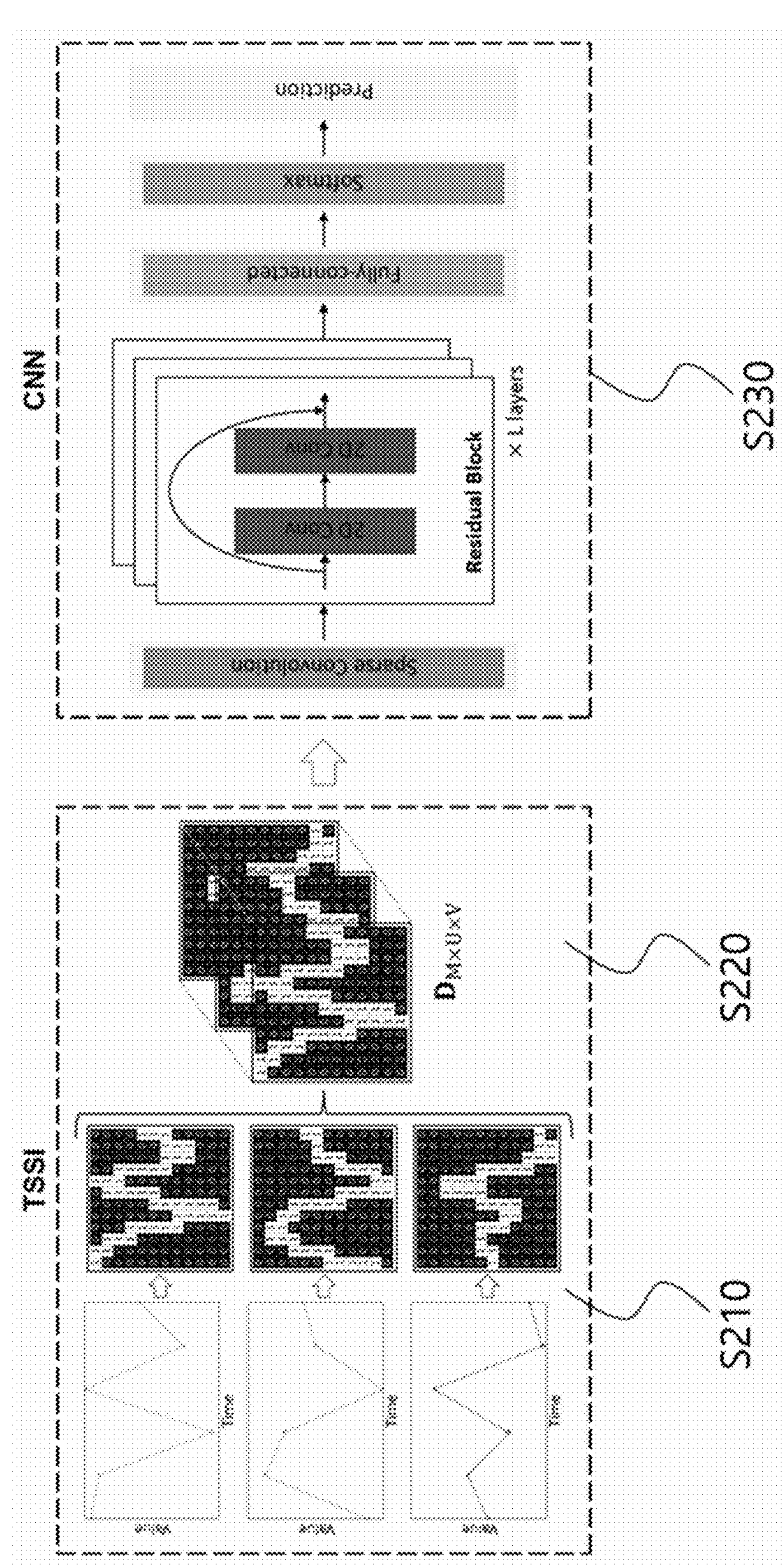
FIG. 2 is a diagram illustrating an overall procedure of an encoding method of converting time series data into an image, according to another embodiment of the present disclosure.

FIG. 2 is a diagram illustrating an overall procedure of an encoding method of converting time series data into an image, according to another embodiment of the present disclosure.

As illustrated in FIG. 2, an encoding method of converting time series data into an image includes step S210 of encoding each univariate time series data into a binary image, step S220 of combining the binary image with a multi-channel image, and step S230 of performing tasks.

First, in step S210 of encoding each univariate time series data into a binary image, multiple pieces of univariate time series data are encoded into a binary image by using a time axis and a time series value axis respectively as the x-axis and y-axis.

Specifically, $x_m=(x_{m,1}, \ldots, x_{m,T_m})$ is set as m-th univariate time series data. Considering a configuration of $x_m$, a range of the x-axis is from 0 to $T_m$, and a range of the y-axis is from the minimum value of all time series values to the maximum value of all time series values (that is, $X_i$, i=1 . . . N).

Thereafter, the time series data is encoded as a binary image $D_m=(d_{u,v})\in \mathbb{R}^{U\times V}$ in a U×V pixel grid.

Here, U and V are user values that determine a pixel size, and a pixel value of the binary image is determined by Equation 2 below.

$$d_{u,v} = \begin{cases} 1 \\ 0 \end{cases} \quad \text{Equation 2}$$

In this case, 1 is a value when a pixel includes one or more time series data, and 0 is a value when the pixel does not include one or more time series data.

In this case, when $T_m$<<U, the time series data may be supplemented to ensure continuity.

Also, through step S210, efficiency of a 2D CNN model may be increased while maintaining an original time-value relationship between respective pieces of univariate time series data.

Next, in step S220 of combining the binary image with a multi-channel image, multiple binary images encoded in step S210 of encoding each univariate time series data into a binary image may be concatenated to one multi-channel image.

Next, in step S230 of performing tasks, sparse convolution is performed on the generated multi-channel image, and then the data generated through the sparse convolution is used in performing tasks. The filter used in this case is a CNN sparse convolution filter, which spatially preserves the existing time-value dependency in the obtainable time series image.

For example, the task may be classification and the classification made by the CNN-based classifier uses a published method.

That is, according to another embodiment of the present disclosure, a time series as screenshot images (TSSI) encoding method may be used instead of a sparse multi-channel (SMC) encoding method, and thereafter, the sparse convolution may be performed, and tasks such as classification, clustering and anomaly detection may be performed.

Hereinafter, a result of comparison between the method proposed in the present disclosure and the known method is described with reference to FIGS. 3 and 4.

Figures 3, 4:
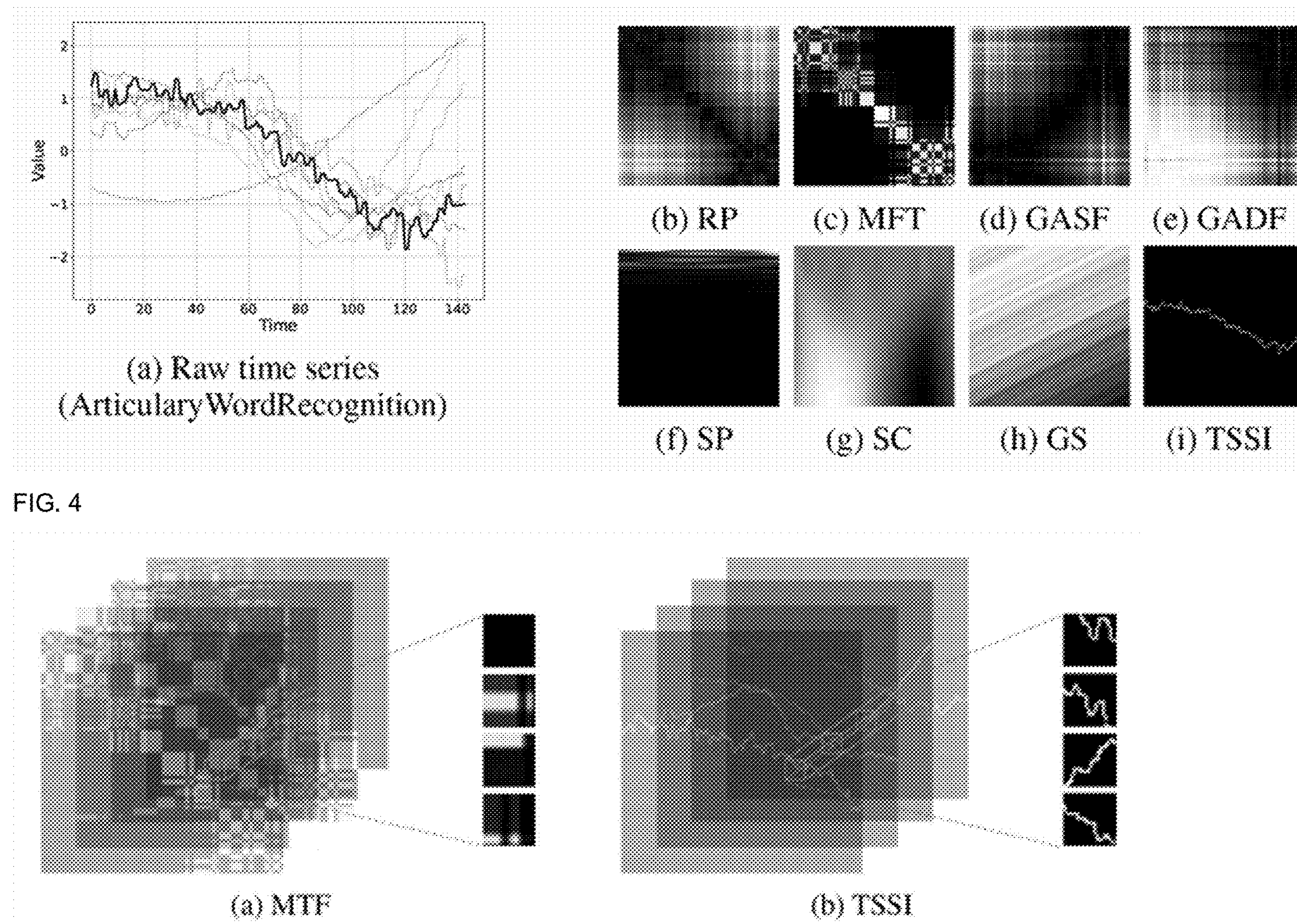
FIG. 3 illustrates views representing images using multiple methodologies for selected variables of a multivariate time series sample.
FIG. 4 illustrate views obtained by comparing a methodology according to an embodiment of the present disclosure with the known methodology.

FIG. 3 illustrates views representing images using multiple methodologies for selected variables of a multivariate time series sample.

More specifically, (b) to (h) of FIG. 3 are images encoded with the time series data of (a) of FIG. 3 using the known method, are converted into images in the form of T by T by comparing one-to-one respective elements of the time series data having a length of T, are converted by considering a frequency and wave of the time series data, or are converted by concatenating one-dimensional time series data by using values of the time series as it is.

In addition, referring to (i) of FIG. 3, a visual representation is generated by using the method of the present disclosure, and the time series data is provided intuitively and comprehensively by capturing both time value dependencies within each univariate time series data and correlations between pieces of multivariate time series data.

Also, in the most known methods, respective element are compared one-to-one, and corresponding values are displayed in two dimensions, and in this case, there is a limit in which, when a length of the time series data is lengthened, calculation time increases and an image size increases.

In contrast to this, the method according to the present disclosure has an advantage in the amount of calculation because the time series data may be converted into an image regardless of the length of the time series data.

Also, in the image conversion of the known method, the x-axis and y-axis represent time information, but in the method according to the present disclosure, CNN technology is suitable for application because the x-axis represents time, and the y-axis represents time series values, and time and value information is converted into a position format.

Also, in the known methods, individual images are combined and analyzed in multiple dimensions by a multi-channel convolution method by considering visual elements of each dimension of multivariate time series data, but in the method according to the present disclosure, by considering time and value simultaneously, a correlation between respective dimensions of a multivariate time series data may be effectively analyzed.

FIG. 4 illustrate views obtained by comparing a methodology according to an embodiment of the present disclosure with the known methodology.

More specifically, (a) and (b) of FIG. 4 are images obtained by encoding a real multivariate time series data consisting of four pieces of time series data by using MTF and TSSI.

In this case, respective univariate time series data are encoded into images, and as a result, the images are combined to generate a multi-channel image, and the multi-channel image is used as an input of a multi-channel CNN. (b) of FIG. 4 preserves a time-value relationship in all encoded images, both a correlation in series data and a correlation between pieces of series data may be preserved during convolution operations while the kernel passes through the encoded multi-channel image, and accordingly, the method of the present disclosure is particularly useful when dealing with multivariate time series data.

Also, unlike the known encoding method of generating numerical representations that may be used as image pixel values, in (b) of FIG. 4, a visual and intuitive representation of the multivariate time series is generated directly, and accordingly, images may be more easily recognized.

The present disclosure is described with reference to the embodiments illustrated in the drawings, but the embodiments are merely examples, and those skilled in the art will understand that various modifications and other equivalent embodiments are possible therefrom. Therefore, the true technical protection scope of the present disclosure should be determined by the technical idea of patent claims below.

What is claimed is:

1. An encoding method of converting time series data to an image, the encoding method comprising:

encoding each piece of univariate time series data into a binary image;

combining the encoded binary images to form a multi-channel image;

performing convolution on the multi-channel image; and performing a task using data obtained by the convolution, wherein the performing of the convolution includes:

classifying the multi-channel image generated in the combining of the encoded binary images into a region where data exists and a background image by using a two-dimensional (2D)) sparse convolution filter of a convolutional neural network; and applying the convolution only to the region where the data exists, to reduce a computational amount while preserving a time-value relationship in the univariate time series data.

2. The encoding method of claim 1, wherein, in the encoding of each piece of univariate time series data into the binary image, multiple pieces of univariate time series data are encoded into the binary images by using a time axis and a time series value axis-respectively as an x-axis and a y-axis, respectively.

3. The encoding method of claim 1, wherein, in the combining of the encoded binary images to form the multi-channel image, the encoded binary images are concatenated to a single multi-channel image.

* * * * *